K. MALCHER.
TIP TRUCK.
APPLICATION FILED MAY 26, 1911.

1,010,655.

Patented Dec. 5, 1911.
3 SHEETS—SHEET 1.

Witnesses:
John N. Hoving
Alfred R. Anderson

Inventor:
KONRAD MALCHER
By H. van Dedem
Attorney

K. MALCHER.
TIP TRUCK.
APPLICATION FILED MAY 26, 1911.

1,010,655.

Patented Dec. 5, 1911.

3 SHEETS—SHEET 3.

Witnesses:
John H. Hoving
Alfred R. Henderson

Inventor.

KONRAD MALCHER
By H. van Desenreel
Attorney

UNITED STATES PATENT OFFICE.

KONRAD MALCHER, OF GLEIWITZ, GERMANY.

TIP-TRUCK.

1,010,655.  Specification of Letters Patent.  Patented Dec. 5, 1911.

Application filed May 26, 1911. Serial No. 629,725.

*To all whom it may concern:*

Be it known that I, KONRAD MALCHER, a citizen of the German Empire, and residing at Gleiwitz, Silesia, German Empire, have invented new and useful Improvements in Tip-Trucks, of which the following is a full, clear, and exact description.

The present invention relates to that class of tipping trucks in which the body of the truck is first swung around on the wheel frame to about 90° in the horizontal plane and then tipped endwise between the two pairs or sets of wheels to discharge the contents of the truck.

According to the present improvements the body of the truck is pivotally supported on a tip frame, which embraces or incloses the two frames—one at each end—on which the wheels are mounted, and the upper surface of which tip frame is flush with the upper surfaces of the wheel frames, so that when the body of the truck is in its normal position on the frame it will rest equally both on its own tipping frame and on the wheel frames. Furthermore the tipping mechanism is located and arranged so that it cannot be operated until the body of the truck has been swung around in the horizontal plane ready to be tipped.

In order to render the present specification easily intelligible, reference is had to the accompanying drawings in which similar letters of reference denote similar parts throughout the several views.

Figure 1:
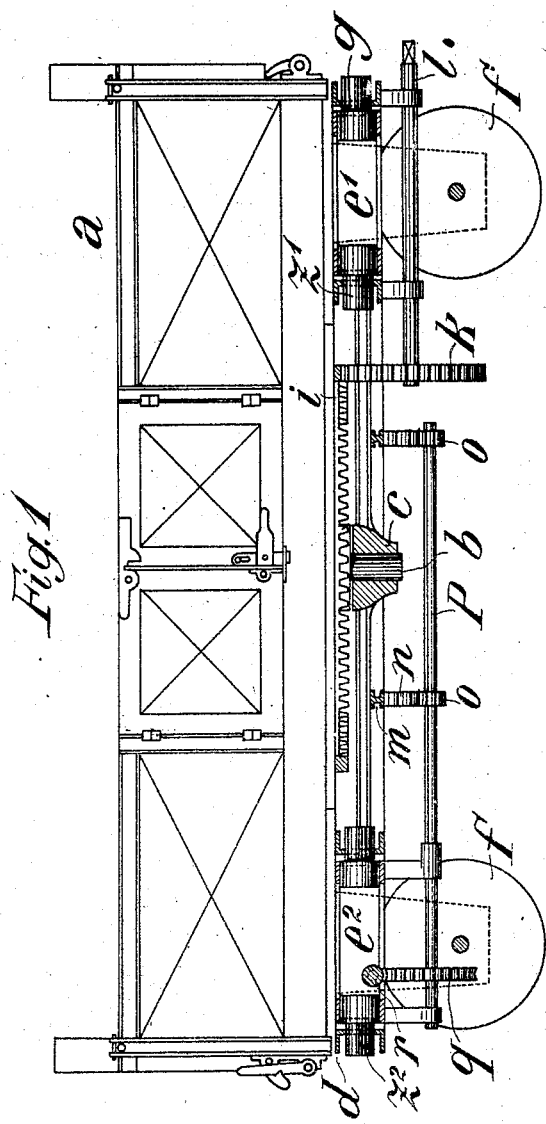
Figure 2:
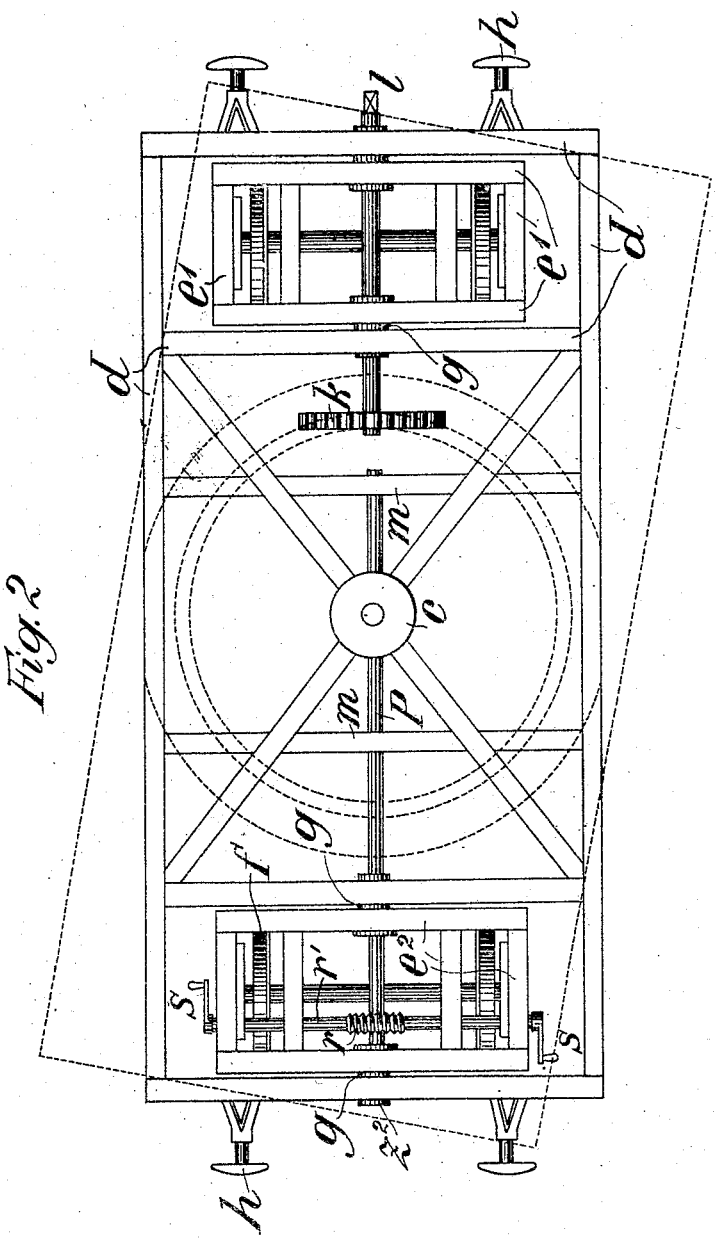
Figure 3:
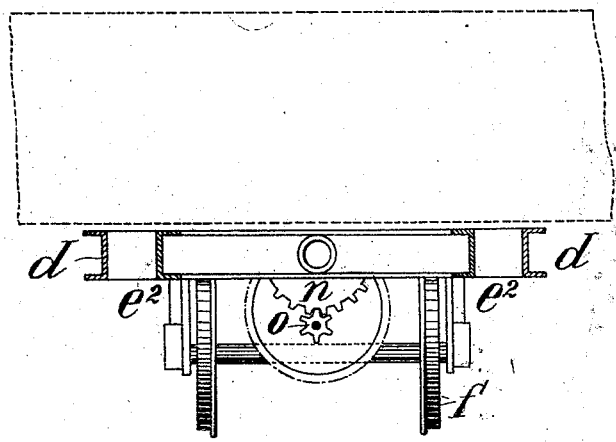
Figure 4:
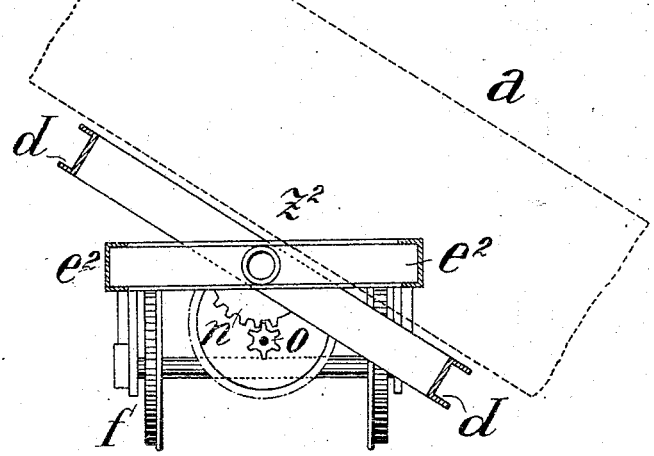

Figure 1 is a side elevation of one form of the truck partly in section, Fig. 2 is a plan view of the under framing, Fig. 3 is a cross sectional view of the underframing showing the body of the truck in dotted lines, swung around, but not yet tipped and Fig. 4 is a similar view showing the frame and the body in the tipped position.

The body $a$ of the truck is provided at its bottom with a central downwardly extending pivot $b$ adapted to engage a pivot bearing $c$ supported by means of suitable cross arms or stays (Fig. 2) in the tip frame $d$. The means advantageously employed for swinging the body $a$ of the truck around its pivot $b$ may consist of a crown of downwardly extending teeth $i$ fixed to the bottom of the body and engaged by a suitable gear or pinion $k$ keyed to a shaft $l$ mounted either in the tip frame $d$ or, as shown, in the wheel frame $e'$ and having its outer end squared or otherwise shaped to receive a hand crank or the like. The frames $e'$ $e^2$ carrying each a pair (or, in the case of bogies, a set) of wheels $f$ are rigid frames which support the tip frame $d$ by means of pivotal connections $g$ $q$.

As will be seen from Figs. 3 and 4, the top of these wheel frames $e^1$ $e^2$ are flush with the top of the tip frame $d$ when the latter is in its horizontal position, so that the body of the truck will rest on all three frames when in its normal position. The tip frame $d$ entirely incloses the two wheel frames thus protecting them against external damage, when the truck is running. The frame $d$ and with it the truck body may be tipped or tilted by any suitable means. Thus for instance in the drawing, toothed segments $n$ $n$ are provided, supported on cross beams $m$ $m$ of the frame $d$. Pinions $o$ $o$ on a shaft $p$ engage these segments, the said shaft $p$ being mounted in suitable bearings in the wheel frame $e^2$. The shaft $p$ carries, keyed thereto, a worm wheel $q$ in which a worm $r$ engages, fixed to or formed on a shaft $r^1$ mounted in the frame $e^2$. This shaft carries cranks $s$ $s$ one at each end and these cranks are located within the tip frame $d$, underneath the body of the truck. Thus as will be readily seen from Fig. 2 they are not accessible for operation to tip the frame $d$, until the body $a$ of the truck has been swung around in the horizontal plane.

The operation of the device will be obvious from the foregoing specification and needs no further explanation. The buffers $h$ are mounted on the tip frame $d$ and will be tipped or tilted with the same.

The embodiment of the invention is described and illustrated as an example, the details of construction might be varied in many ways.

I claim as my invention:—

1. In a tip truck, comprising a pair of rigid wheel carrying frames, one approximately at each end of the truck, a truck body pivotally supported thereon, means for swinging the same around its pivot in a horizontal plane and means for tipping the same, when swung around, the combination of a tip frame entirely inclosing the wheel carrying frames and pivots located longitudinally centrally of the truck to support said tip frame on the said wheel frames.

2. In a tip truck comprising a pair of rigid wheel carrying frames, one approximately at each end of the truck, a truck body pivotally supported thereon, means for swinging the same around its pivot in a horizontal plane and means for tipping the same, when swung around, the combination of a tip frame entirely inclosing the wheel carrying frames, pivots to support said tip frame longitudinally and centrally in said wheel frames, the upper surfaces of said tip and wheel frames being flush with each other.

3. In a tip truck comprising a pair of rigid wheel carrying frames, one approximately at each end of the truck, a truck body pivotally supported thereon, means for swinging the same around its pivot in a horizontal plane and means for tipping the same, when swung around, the combination of a tip frame entirely inclosing the wheel carrying frames, pivots to support said tip frame longitudinally and centrally in said wheel frames and means for tipping said frame, after the truck body has been swung around, the tipping mechanism being located beneath the end of the truck body when the latter is in its normal position on the said frames.

In testimony whereof I affix my signature in the presence of two witnesses.

KONRAD MALCHER.

Witnesses:
H. WAIT,
FRANK KRATZ.